Figure 1:
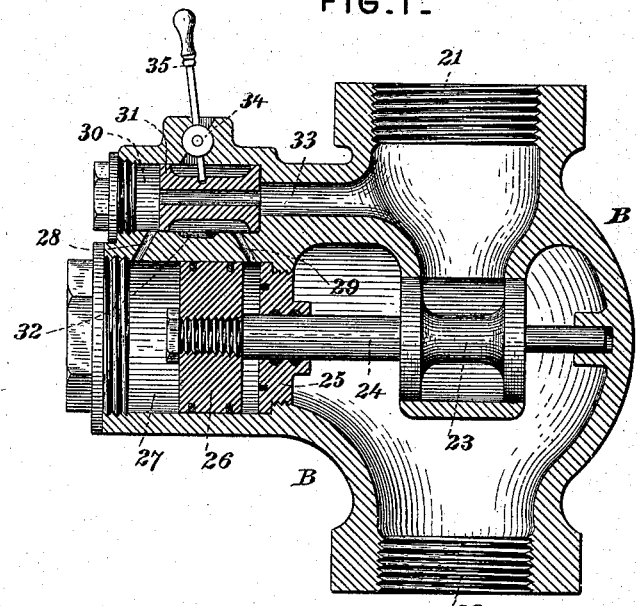

(No Model.)

R. J. PRATT & J. ROBISON.
VALVE.

No. 416,948. Patented Dec. 10, 1889.

Attest:
Geo. T. Smallwood.
Earrard Cranforth

Inventors
Robert J. Pratt,
Joseph Robison,
by John Chenne, Atty.

THE NORRIS PETERS CO., WASHINGTON, D. C.

UNITED STATES PATENT OFFICE.

ROBERT J. PRATT AND JOSEPH ROBISON, OF GREENBUSH, NEW YORK.

VALVE.

SPECIFICATION forming part of Letters Patent No. 416,948, dated December 10, 1889.

Application filed August 31, 1888. Serial No. 284,219. (No model.)

*To all whom it may concern:*

Be it known that we, ROBERT J. PRATT and JOSEPH ROBISON, citizens of the United States, residing at Greenbush, in the county of Rensselaer and State of New York, have invented certain new and useful Improvements in Valves; and we do hereby declare the following to be a full, clear, and exact description of the invention, such as will enable others skilled in the art to which it appertains to make and use the same.

Our invention relates to means for controlling automatically or manually the flow of the motive and attemperating fluid within the main and branch pipes or conduits of a distributing system. It is especially designed for regulating automatically or otherwise the supply of steam from the main conduit of a steam-heating system to the radiators thereof, and in one of the forms illustrated is particularly serviceable in connection with the steam-heating system shown in the application filed September 12, 1888, Serial No. 285,227, by Robert J. Pratt as sole inventor, and wherein communication between the main steam-supply conduit and any particular radiator is automatically established or cut off and at the same time a by-pass opened to the remaining radiators of the system by means of a compound valve governed by oppositely-acting magnetic devices, whose battery-circuits are under the control of circuit-closing thermostats having double contacts and located within the rooms to be heated. It will be apparent, however, that our improvements may be embodied in other systems of steam-heating, and indeed are generally applicable to all systems wherein an attemperating-fluid is employed for the purpose of regulating temperature—as, for instance, in heating by air or expansive gases, hot water, and other liquids, or in cooling by the circulation of brine, ammonia, ether, and the like—and whether the valve mechanism is to be operated automatically by a thermostat or manually at the will of the operator.

The principal object of our invention is to decrease as much as possible the resistance opposed by the valve mechanism to the actuating force determining its movements—a matter of the utmost importance where said actuating force is that of magnetic attraction, as in the construction wherein our improvements will be principally employed. We have devised an arrangement of parts wherein a balanced supply-valve is governed by a supplemental balanced slide-valve controlling the flow of the motive fluid actuating said supply-valve, the supplemental valve being moved by a stem or rod adapted to be controlled either manually or by opposing electro-magnets, and in the latter case requiring a battery-current of comparatively small power and trifling expense to operate it promptly and effectively.

Figure 2:
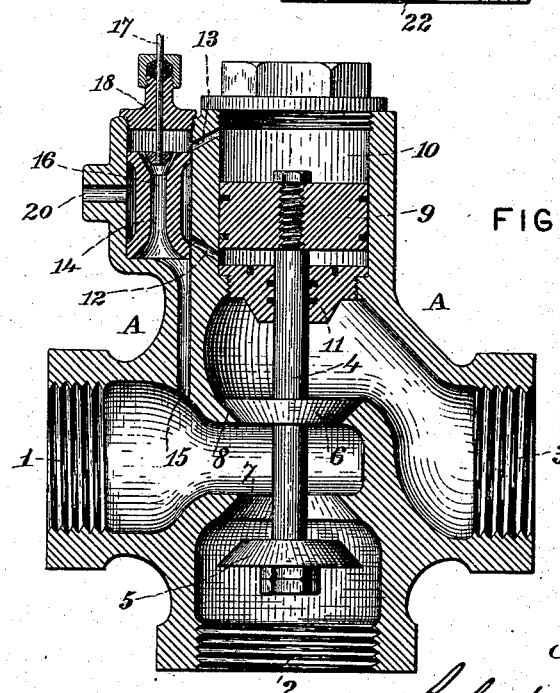

In the accompanying drawings, illustrative of our invention, Figure 1 represents in section a steam-pipe coupling constructed and arranged in accordance with one form of our invention, and Fig. 2 represents a like view of a modification thereof.

Similar figures of reference indicate similar parts throughout the several views.

Referring to Fig. 2 of the drawings, A indicates a steam-pipe coupling or fitting, having screw-threaded coupling-extensions 1 2 3, for the reception of the threaded ends of steam-conveying pipes. Coupling-extension 1 is designed to communicate with the supply-pipe from a steam-boiler or its equivalent, and the extensions are designed to connect, respectively, with the by-pass pipe and with the coil or other radiator, as is more fully set forth in the application for Letters Patent of Robert J. Pratt, hereinbefore referred to.

The flow of steam from the supply-pipe to the openings 2 and 3 is regulated by means of a compound valve having a guide-stem 4, provided with the conical valves 5 6, having corresponding seats 7 8, as shown, in the interior of the fitting, and the valve-stem, if desired, having a guide 36 intermediate between said seats. At its outer end the valve-stem is provided with a piston-head 9, of larger area than either valve and working within a chamber 10, forming a portion of the fitting, said piston being suitably packed, and the valve-stem passing through a stuffing-box 11, which cuts off communication between the chamber 10 and the pipe system, except through ports 12 13, communicating with the chamber 14, which opens freely into the steam-supply conduit by means of the passage 15, which may, as shown, be readily formed in the wall of the fitting.

Within the chamber 14 is located a piston slide-valve having a longitudinal opening 16 and governing the ports 12 13. The said slide-valve is provided with a stem 17, passing through a suitable stuffing-box 18, the said valve being normally in such position as to leave one of the ports 12 13 constantly in communication with the main steam-supply pipe, the other port communicating with the exhaust 20, as will be readily understood.

In the construction illustrated in Fig. 2 the parts are so arranged that communication between the coupling branches 1 and 3 is cut off when the piston 9 is in the position indicated in said figure. At this time the steam-space of the chamber 10 is in communication with the main steam-supply conduit by means of port 13, the hollow interior 16 of the valve, and the passage-way 15, leading to the coupling-branch 1, the port 12 at the same time opening into the exhaust 20. Simultaneously the valve 5 is lifted from its seat 7 and communication established between the main steam-supply pipe and the pipe connected with the coupling-branch 2. The said valve may now be readily operated (either manually or automatically by means of a magnet whose battery-circuit is controlled by a thermostat) so as to connect the pipe 13 with the exhaust 20 and connect the port 12 with the main steam-supply pipe through the passage 15. The effect of this movement of the slide-valve will be to cause the piston 9 to move to the opposite end of the chamber 10, thereby opening the valve 6 and closing the valve 5. The compound valve 5 6, it will be noted, is a balanced valve, the pressure from the passage 3 being the same upon each of the valve-disks, and any back-pressure from either 4 or 5 being fully compensated for and overcome by the large area of the piston 9. The slide-valve governing the ports to the main piston-chamber 10 is also balanced, so that the smallest amount of force is necessary to move said slide-valve, while the action of the piston attached to the main valve is almost instantaneous.

In the form of our invention illustrated in Fig. 1 the main characteristics of that just described are preserved. The fitting B in this instance, however, is provided with but two coupling-branches 21 22, and is interposed directly in the main supply-conduit. The valve 23 is provided with a stem 24, passing through a stuffing-box 25, and has connected with it a piston-head 26, operating within the piston-chamber 27. The piston-chamber, as in the former instance, communicates by means of ports 28 29 with a chamber 30, containing a hollow slide-valve 31, said chamber 30 having an exhaust-port 32 and communicating by a passage-way 33 with the main steam-supply pipe.

The reciprocation of the valve 31 within the chamber 30 is effected by means of pivoted arm 34, having a steam-tight globe-bearing within the wall of the fitting, as shown. The projecting arm 35 of the valve-stem constitutes the actuating portion of the reciprocating valve and corresponds to the piston-stem 17. (Illustrated in Fig. 2.) For convenience of illustration we have shown this arm as provided with a handle for operating it by hand, although it will be apparent that the said arm may constitute the armature of two oppositely-disposed electro-magnets adapted to move it in one direction or the other, according as the corresponding magnet is actuated.

From what has been said with regard to Fig. 2 the operation of the construction shown in Fig. 2 will be apparent. The reciprocation of the slide-valve 31 opens successively, as desired, communication between the ports 28 29 and the passage 33 and exhaust-port 32, according as the main supply-valve is to be opened or closed.

Having thus described our invention, what we claim is—

1. The combination, with an attemperating-fluid conduit provided with a piston-chamber and a balanced valve located therein, said valve being provided with a piston-head working within the piston-chamber, an auxiliary fluid-chamber connected with the main fluid-supply and the piston-chamber by suitable ports or passages and having an exhaust-port, and a balanced slide-valve governing said ports and having an actuating-rod, said slide-valve being located within said auxiliary chamber, substantially as described.

2. The combination, with an attemperating-fluid conduit provided with a piston-chamber and a balanced valve, said valve being provided with a piston-head working within the piston-chamber, an auxiliary fluid-chamber connected with the main fluid-supply and the piston-chamber by suitable ports or passages and having an exhaust-port, and a balanced slide-valve governing said ports and having a longitudinal opening and an actuating-rod, said slide-valve being located within said auxiliary chamber, substantially as described.

In testimony whereof we affix our signatures in presence of two witnesses.

ROBERT J. PRATT.
    JOSEPH ROBISON.

Witnesses:
 Ed. K. Curtis,
 Benj. F. Allen.